United States Patent [19]

Schuster et al.

[11] 4,076,494
[45] Feb. 28, 1978

[54] ORGANIC COMPOUNDS

[75] Inventors: Johann Schuster, Basel; Karl Taubert, Ettingen, both of Switzerland

[73] Assignee: Sandoz Ltd., Basel, Switzerland

[21] Appl. No.: 738,568

[22] Filed: Nov. 3, 1976

[30] Foreign Application Priority Data

Nov. 10, 1975 Switzerland ............... 14492/75

[51] Int. Cl.$^2$ .............. D06P 1/68; C09D 11/04
[52] U.S. Cl. ..................... 8/2.5 A; 8/1 W;
8/85 R; 8/88; 8/172 R; 8/174; 8/179; 106/22;
544/183; 544/193
[58] Field of Search ............ 8/2.5, 85 R, 1 W, 174,
8/88, 2.5 A; 106/22; 260/248 R, 248 A

[56] References Cited

U.S. PATENT DOCUMENTS

| 3,088,948 | 5/1963 | Little et al. | 260/248 |
| 3,294,796 | 12/1966 | Poon | 260/248 |
| 3,313,812 | 4/1967 | Churchill et al. | 260/248 |

OTHER PUBLICATIONS

Moore, N. L., "Heat-Transfer Printing, A Review of the Literature", J. Soc., Dyers and Colorists, Sep., 1974, pp. 318-325.

Primary Examiner—A. Lionel Clingman
Attorney, Agent, or Firm—Gerald D. Sharkin; Richard E. Vila; Thomas C. Doyle

[57] ABSTRACT

Disclosed is a preparation, for use in the production of inks for transfer printing, which preparation comprises, in intimate admixture, a disperse dye and/or dispersion optical brightener, sublimable in the range of from 180° to 220° C, and a dispersing aid being a compound of formula I,

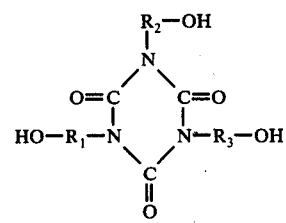

in which $R_1$, $R_2$ and $R_3$, independently, are straight or branched chain $C_{2-8}$alkylene radicals, the OH groups being bound other than onto the carbon atoms adjacent the nitrogen atoms, the production and use thereof.

17 Claims, No Drawings

ORGANIC COMPOUNDS

The invention relates to dyestuff and optical brightener preparations for use in the production of inks for transfer printing, the inks produced therefrom and transfer printing processes employing such inks.

Transfer printing processes, wherein inks containing a sublimable dyestuff or optical brightener are printed on a temporary support, such as of paper or aluminum, and the print so formed is placed against a final substrate and subjected to elevated temperatures to cause transference of the print from the temporary support to the final substrate, by sublimation of the dyestuff or brightener, and now well known in the art and well documented in the literature.

Where disperse dyestuffs or dispersion optical brighteners are used in the inks, it has hitherto been generally recommended that, particularly for organic solvent based inks, the dyestuffs and brighteners are employed free from dispersing agents. This lack of dispersing agent, however, necessitates prolonged treatment of the dyestuffs and brighteners in sand mills and like pulverisers to obtain uniform inks and to achieve even transfer of dyestuff or brightener from the temporary support to the final substrate. The lack of a dispersing agent also generally rules out the presence of more than a very small amount of water in the inks produced therefrom. We have now, however, found a class of compounds which are eminently suitable as dispersion aids for disperse dyestuffs and dispersion optical brighteners and which enable the dyestuffs and brighteners to be easily stirred into ink bases irrespective of whether such bases are of water, of an organic solvent or of an aqueous/organic solvent mixture.

Thus, the invention provides a preparation, for use in the production of inks for transfer printing, which preparation comprises, in intimate admixture, a disperse dye and/or dispersion optical brightener, sublimable in the range of from 180° to 220° C, and a dispersing aid, said aid being a compound of formula I,

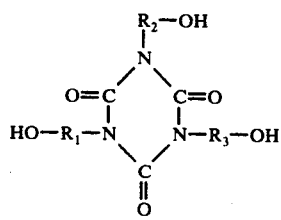

in which $R_1$, $R_2$ and $R_3$, independently, are straight or branched chain $C_{2-8}$ alkylene radicals, the OH groups being bound other than onto the carbon atoms adjacent the nitrogen atoms.

The weight ratio of the compound of formula I to the disperse dyestuff or dispersion brightener or mixture thereof in such preparation is preferably in the range of 1:49 to 1:1, more preferably 1:24 to 1:5 and most preferably from 1:16.6 to 1:8.5. Thus, where the preparation contains solely disperse dye and/or dispersion optical brightener and a compound of formula I, the compound of formula I constitutes preferably 2–50%, more preferably 4–20% and most preferably 6–12%, by weight of said preparation, the balance being disperse dye and/or dispersion optical brightener.

The preferred compound of formula I is the known compound tris-(hydroxyethyl)-isocyanurate. The other compounds of formula I are either known or may be obtained in manner analogous to that for the production of the known compounds.

The preparation provided by the invention is conveniently prepared by mixing the compound of formula I with the disperse dyestuff and/or dispersion optical brightener press-cake and water (the water suitably being employed in an amount by weight equal to the weight of the press-cake) to form a paste, pre-dispersing the paste, e.g. by stirring or shaking, and then finely dispersing the paste, e.g. by short treatment in a pearl or sand mill. Drying can be carried out in conventional manner, e.g. using a paddle dryer or by comminution.

The preparation may contain other additives, it being especially advantageous to add an emulsifier selected from the group consisting of condensation products of formaldehyde with a naphthalenesulphonic acid in the form of their alkali-metal salts (such products preferably containing on average no more than six naphthalene units), especially the alkali-metal salts of dinaphthylmethanedisulphonic acids, particularly the sodium salt, and of higher, e.g. $C_{6-12}$, alkyl esters of sulpho succinic acid alkali-metal salts, especially sodium dioctylsulpho succinate. Where such an emulsifier is present, it is preferably present in an amount of from 0.01 to 3%, more preferably in an amount of from 0.02 to 2%, based on the dry weight of the preparation. Where an emulsifier and/or any other additive is contained in the dystuff preparation, such are preferably intimately admixed therein, being conveniently thoroughly dispersed therein along with the dispersing aid of formula I. The preparation, however, should be free from any dispersing agent which is soluble only in water.

The preparation of the present invention, whilst it may contain such, is preferably free from water or organic solvent. It is preferably in powder form, having a preferred average particle size of less than 10 μ, more preferably less than 5 μ, and most preferably less than 2 μ.

Production of printing inks for transfer printing is conveniently effected by stirring the preparation according to the invention, in the desired amount, depending on the desired depth of shade, into a water, organic solvent or water/organic solvent mixture ink base, along with a thickener or binder. The organic solvent may be any conventionally used in transfer printing inks, e.g. selected from alcohols, ketones, benzene, toluene, xylene etc. and mixtures thereof. As will be appreciated, however, where aqueous/organic solvent mixture ink bases are desired, either the organic solvent will be one which is water-miscible or the amounts of water and/or organic solvent, where non-water-miscible, will be chosen so as to avoid phase separation. The presence of the emulsifier in the preparation provided by the invention will, of course, enable greater amounts to be present without phase separation occurring than if the emulsifier were not included. The thickener or binder may also be any of the many conventional thickeners or binders used in transfer printing inks, for example, ethyl cellulose of the so-called N-types, hydroxy ethyl cellulose, hydroxypropyl cellulose, polyvinyl butyral and mixtures thereof. Other additives and aids conventional in transfer printing inks may also be included.

Employing the inks provided by the invention, a temporary support e.g. of paper or other suitable sheet material, e.g. of aluminium, may be printed therewith, employing conventional techniques, such as rotary engraving, helio engraving and rotary screen techniques etc., in any desired, e.g. multi-colour, pattern. In conventional manner, the print so formed, can be placed in contact with the substrate, generally a textile substrate, intended finally to bear the print, and the temporary support heated to a temperature at which the disperse dye and/or optical brightener sublimes, generally from 150° to 250° C and preferably from 210° to 230° C, optionally with cooling of the final substrate on that side thereof remote from the temporary support.

Substrates which are printable by transfer printing techniques are well known and are set out in German Published Specifications No. 1,771,812 and 1,771,813 as well as U.S. Pat. No. 3,707,346. The preferred substrates, however, are textile substrates comprising or consisting of polyester fibres.

The dyestuffs and optical brighteners employed in the present invention are likewise of known classes having the known characteristics for transfer printing. Those with an even sublimation curve between 180° and 220° C are, however, preferred.

The dye preparation provided by the invention, as well as possessing the versatility of being equally suitable for the production of aqueous, organic solvent and aqueous/organic solvent mixture based inks, and as well as possessing good stir-in properties in such bases, give inks which when transfer printed produce sharp and clear prints on the final substrate, with good transference of dyestuff and/or brightener.

The following Examples illustrate the invention. All temperatures are in degrees centigrade.

EXAMPLE 1

29.80 kg of C.I. Disperse Red 60 in press-cake form (70.6%) are pre-dispersed in an Ultra Turrax machine with 1.85 kg of tris-(hydroxyethyl)-isocyanurate and 68.35 kg of water. Subsequently, in order to obtain a grain fineness of below 5 $\mu$, preferably below 2 $\mu$, the resulting product is further dispersed in a sand mill and then comminuted. The mixture may be used simply and without difficulty as an ink basis for transfer printing inks. In the same manner, the dyestuffs C.I. Disperse Orange 25 and C.I. Disperse Blue 58 may be processed into initial products for printing inks.

EXAMPLE 2

By repeating the procedure of Example 1, but predispersing 0.182 kg of the sodium salt of dinaphthylmethane-disulphonic acid along with the dyestuff presscake, tris-(hydroxyethyl)isocyanurate and water, a very similar product is obtained, equally suitable for use in the production of inks for transfer printing.

EXAMPLE 3

By repeating the procedure of Example 2, but replacing the sodium dinaphthylmethane disulphonate used therein with an identical amount of sodium dioctylsulphosuccinate, a very similar product, equally suitable for use in the production of inks for transfer printing is obtained.

EXAMPLE 4

5 Parts of each of the preparations produced in Examples 1 to 3 are separately stirred into ink bases of the following compositions.

A. Solvent Base
21.0 parts by weight of synthetic resin SK (ketone resin)
9.0 parts by weight of "Ethocel" 10 cps (ethyl cellulose)
10.0 parts by weight of ethyl glycol
60.0 parts by weight of ethanol
100.0 parts by weight B. Aqueous Base
13.0 parts by weight of "Natrosol" 250 L (hydroxyethyl cellulose)
87.0 parts by weight of demineralised water
100.0 parts by weight to produce both organic solvent based inks and aqueous based inks. The inks are then printed onto a temporary support of paper, followed by transfer printing onto a textile substrate. Clear and sharp prints are obtained.

What is claimed is:

1. A composition suitable for use in transfer printing inks which comprises, in intimate admixture, a disperse dye or dispersion optical brightener sublimable at a temperature of 180° to 220° C., or a mixture of such a dye and optical brightener, and, as a dispersing aid, a compound of the formula

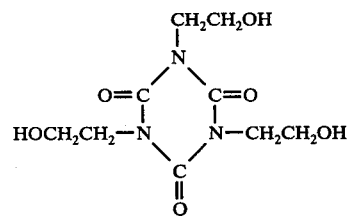

2. An ink suitable for transfer printing comprising a composition according to claim 1 and a water, organic solvent or water/organic solvent base.

3. The composition of claim 1, wherein the weight ratio of the compound of formula I to the dye or brightener or mixture thereof is from 1:49 to 1:1.

4. The composition of claim 3, wherein said ratio is from 1:24 to 1:5.

5. The composition of claim 4, wherein said ratio is from 1:16.6 to 1:8.5.

6. The composition of claim 1 comprising, additionally, an emulsifier selected from condensation products of formaldehyde and a naphthalenesulphonic acid, and from $C_{6-12}$alkyl esters of sulphosuccinic acid alkali metal salts.

7. The composition of claim 6, wherein said condensation product contains, on average, no more than six naphthalene units.

8. The composition of claim 7, wherein said condensation product is an alkali-metal salt of dinaphthylmethanedisulphonic acid.

9. The composition of claim 6, wherein said ester is sodium dioctylsulphosuccinate.

10. The composition of claim 6, wherein said emulsifier is present in an amount of from 0.01 to 3%, based on the dry weight of the composition.

11. The composition of claim 10, wherein said amount is from 0.02 to 2%.

12. The composition of claim 1 in powder form.

13. The composition of claim 12, wherein said powder form has an average particle size of less than 10 $\mu$.

14. The composition of claim 13, wherein said average particle size is less than 5 $\mu$.

15. The composition of claim 14, wherein said average particle size is less than 2 $\mu$.

16. A temporary support for use in transfer printing having printed thereon a print formed from an ink of claim 2.

17. A transfer printing process comprising placing the print on the temporary support of claim 16 in contact with the substrate to be printed, and heating said support to a temperature at which the dyestuff or brightener sublimes and thereby transferring the print from said temporary support to said substrate.

* * * * *